United States Patent
Heemann et al.

(10) Patent No.: US 8,877,868 B2
(45) Date of Patent: Nov. 4, 2014

(54) HOT MELT ADHESIVE COMPRISING CYANOACRYLATE CURING COMPOUNDS

(71) Applicants: Henkel AG & Co. KGaA, Duesseldorf (DE); Henkel Corporation, Rocky Hill, CT (US); Henkel Ireland Limited, Monheim (DE)

(72) Inventors: Marcus Heemann, Neuss (DE); Charles W. Paul, Madison, NJ (US); Maria Xenidou, Duesseldorf (DE); Maja Schroeder, Ratingen (DE); Sebastian Kostyra, Monheim (DE); Marisa Phelan, Roscrea (IE)

(73) Assignees: Henkel IP & Holding GmbH, Duesseldorf (DE); Henkel US IP LLC, Rocky Hill, CT (US)

( * ) Notice: Subject to any disclaimer, the term of this patent is extended or adjusted under 35 U.S.C. 154(b) by 0 days.

(21) Appl. No.: 13/777,337

(22) Filed: Feb. 26, 2013

(65) Prior Publication Data

US 2014/0238603 A1 Aug. 28, 2014

(51) Int. Cl.
 *C09J 4/06* (2006.01)
 *C09J 125/02* (2006.01)
 *C09J 131/04* (2006.01)
 *C09J 133/06* (2006.01)
 *C09J 125/16* (2006.01)
 *C09J 133/12* (2006.01)
 *C09J 123/00* (2006.01)

(52) U.S. Cl.
 CPC .............. *C09J 125/16* (2013.01); *C09J 133/12* (2013.01); *C09J 123/00* (2013.01)
 USPC ........... 525/244; 525/242; 525/293; 525/295; 525/302; 525/304; 525/308

(58) Field of Classification Search
 None
 See application file for complete search history.

(56) References Cited

U.S. PATENT DOCUMENTS

| | | | | |
|---|---|---|---|---|
| 5,965,662 A | * | 10/1999 | Krebs et al. | 524/590 |
| 2011/0151243 A1 | * | 6/2011 | McArdle et al. | 428/319.7 |
| 2011/0251318 A1 | * | 10/2011 | Ishizaki et al. | 524/208 |

FOREIGN PATENT DOCUMENTS

| | | |
|---|---|---|
| EP | 0797604 B1 | 12/1999 |
| EP | 2411428 A1 | 2/2012 |
| WO | 03033562 A1 | 4/2003 |
| WO | 2010023229 A1 | 3/2010 |

* cited by examiner

*Primary Examiner* — Vu A Nguyen
(74) *Attorney, Agent, or Firm* — Steven C. Bauman

(57) ABSTRACT

A curable adhesive composition comprising (i) 10 to 80 wt-% of a derivatives of cyanoacrylic esters, cyanopentadienoate esters, methyliden malonate esters (ii) 15 to 50 wt-% non-reactive (co)polymer(s) based on unsaturated monomers selected from vinyl esters or alkyl (meth)acrylates, iii) hydrocarbon resins and optionally iv) additives.

51 Claims, No Drawings

HOT MELT ADHESIVE COMPRISING CYANOACRYLATE CURING COMPOUNDS

The present invention relates to an adhesive composition comprising a curing system based on cyanoacrylate reactive compounds.

Hot melt adhesives are known in the art. Such adhesives are based on thermoplastic polymers, either being non-reactive or being a reactive prepolymer, which can be applied as melt, and provide their adhesive bond on cooling. The applied polymer may cure to provide the ultimate strength of the bond. The adhesives may contain a wide range of additives which can modify specific properties of the adhesive.

Different curing systems are known. One curing system is based on NCO-containing prepolymers which react with moisture or OH-containing components to crosslink as urethane group. As example WO2003/033562 or EP0797604 disclose such NCO-containing hot melt adhesive. A different type uses Silan-containing prepolymers which may crosslink by moisture to provide Si—O—Si crosslinked groups. Such crosslinking polymers need a sufficient amount of water as part of the crosslinking process. As example the EP 2411428 discloses such adhesives. The reaction is controlled by the diffusion of the water molecules in the adhesive layer.

WO 2010/023229 discloses an adhesive which shall cure radically. The adhesive shall form a non-liquid film which can be cured. A solution of the adhesive is applied and dried to form a film. No meltable and re-solidifying compositions are disclosed.

If adhesives of the prior art are based on non-reactive polymers they provide a good strength of the bond but this bond will be weakend if the bonded substrates are warmed and/or heated up. If reactive hot melt adhesives are applied the green strength will be obtained quickly, thereafter the chemical reaction will finally cross-link and provide the final bonding strength. If PU-based adhesives are used the chemical cross-linking needs some time so that the whole adhesive layer can react. Additionally the synthesis of suitable reactive hot melt polymers provides some restrictions.

It is the object of the present invention to provide an adhesive composition which can be applied also as hot melt adhesive which will firstly have green strength and thereafter cure to the fully cured adhesive.

The object is solved by a adhesive composition comprising (i) 10 to 80 wt-% of derivatives of cyanoacrylic esters, cyanopentadienoate esters and/or methyliden malonate esters (ii) 15 to 50 wt-% non-reactive (co)polymer(s) based on unsaturated monomers based from vinyl esters and/or alkyl (meth)acrylate, iii) hydrocarbon resins and iv) additives.

The adhesive composition shall comprise polymers known as hot melt base polymers. Preferably the (co)polymer is solid at room temperature (25° C.). Such polymers shall impart the properties of a hot melt adhesive to the composition if a sufficient amount is incorporated. Such polymers shall be meltable and during their cooling period provide adhesive properties of hot melts. Suitable polymers based on polymerisation products of unsaturated monomers, e.g. vinyl esters, like vinyl butyrate, vinyl acetate; alkyl (meth)acrylate, like octylacrylate, hexylacrylate, butylacrylate, ethylacrylate, methylacrylate and the corresponding alkylmeth-acrylates. Copolymerisable monomers to such polymer include olefins, like ethylene, propylene or styrene. The polymers are generally thermoplastic polymers. Such polymers are generally known and commercially available. The selection of the monomers shall ensure that a compatibility with the cyanoacrylate reactive system is given.

One group of suitable thermoplastic non-reactive polymers are vinyl ester copolymers. Such copolymers are known to the person skilled in the art. These are polymers with one or more different vinyl esters and optionally comonomers.

Examples of vinyl esters of alkanoic acids of 1 to 18 carbon atoms are vinyl hexanoate, vinyl butyrate, vinyl propionate, vinyl laurate, vinyl stearate, vinyl esters of alkyl carboxylic acids branched in the α-position, preferably vinyl acetate. The polymer can optionally comprise additional comonomers, if the parameters of copolymerization permit. Examples are mono- or di-esters of fumaric, maleic, itaconic, crotonic acid with C4 to C18 alcohols, acrylic or methacrylic esters of C1 to C12 alcohols, such as methyl(meth)acrylate, ethyl(meth)acrylate, propyl(meth)acrylate, butyl(meth)acrylate, ethylhexyl(meth)acrylate, lauryl(meth)acrylate; (meth)acrylonitrile, (meth)acrylamide, alkenes of 2 to 4 carbon atoms, such as ethylene, propylene, isobutylene; allyl esters corresponding to the mentioned vinyl esters and vinyl halides. Also monomers including a functional group can be polymerised. Comonomers can be incorporated e.g. to modify the polarity of the polymer, to modify the glass transition temperature or the elasticity of the polymer. The term copolymer shall also include polymers containing Preferably the copolymer has a content of more than 70 mol % of vinyl acetate monomers. As most preferred ethylene vinyl acetate copolymers (EVA) are suitable. These polymers are usually crystalline or partially crystalline. They have a melting point above 70° C. (measured by DSC).

In another embodiment, the adhesive may contain at least a polymer based on acrylic acid esters and/or methacrylic acid esters. The (meth)acrylic acid esters are selected from (meth)acrylic esters with straight-chain, branched or cycloaliphatic C1 to C20 alcohols, e.g. methyl (meth)acrylate, ethyl (meth)acrylate, n-, iso or tert. butyl (meth)acrylate, stearyl (meth)acrylate, lauryl (meth)acrylate, cyclohexyl (meth)acrylate, isobornyl (meth)acrylate or 2-ethylhexyl (meth)acrylate, mono(meth)acrylates of ethers, polyethylene glycols, polypropylene glycols or mixtures thereof having 5-80 carbon atoms, for example tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether (meth)acrylate or poly(propylene glycol) methyl ether (meth)acrylate, individually or in combination, being particularly suitable. Additionally other monomers can be copolymerised, e.g. 1-alkenes, like C2 to C8 alkenes, in particular ethylene, propylene or 1-hexene, styrene, substituted styrenes, such as α-methylstyrene, vinyltoluene and p-methylstyrene, heterocyclic compounds such as 2-vinyl-pyridine, 3-vinylpyridine, vinyloxolane, vinylfuran, vinylthiophene, vinyithiolane, vinyithiazoles, vinyloxazoles; maleic acid derivatives In particular mixtures of acrylates and methacrylates are useful. Such copolymers are known in different compositions, they include the types as homopolymer, random copolymers or block copolymers. If useful the copolymer may also comprise functional groups e.g. OH-groups.

Examples of such (meth)acrylate copolymers include ethylene alkyl acrylates, alkyl acrylate/alkyl (meth)acrylates, styrene/alkylacrylates, and other copolymers. A preferred embodiment of the invention includes methyl(meth)acrylate/alkylacrylate in particular methyl(meth)acrylate/butylacrylate copolymers having 5 to 35 mol-% of methyl(meth)acrylate.

In each case the non-reactive copolymer shall have a molecular weight from 60,000 to 300,000 g/mol (as measured by GPC). In particular the polymers are solid at room temperature, the softening point is above 150° C. The copolymer shall be selected in a way that it is compatible with the cyanoacrylate system. The amount of one or more copolymers in the adhesive is from 15 to 50 wt-% based on the total adhesive composition.

As additional component the hot melt adhesive shall comprise a compound which will react and cure under humid conditions. In particular the adhesive shall comprise at least one electron deficient olefin component selected from: an electron deficient olefin component which is at least one of propargyl, neopentyl, or adamantly ester; or an electron deficient olefin component comprising a diester; and combinations thereof. Electron deficient components may be selected from the group consisting of cyanoacrylate esters, methylidene malonate esters or cyanopentadionate esters and combinations thereof.

Suitably, the electron deficient olefin component comprises a cyanoacrylate, in particular a 2-cyanoacrylate. Suitably the curable components of the present invention are cyanoacrylates and may be selected from alkyl ester 2-cyanoacrylates ($\alpha$-cyanoacrylates), alkoxyalkyl ester 2-cyanoacrylates, di-cyanoacrylates or adamantyl alcohol cyanoacrylates.

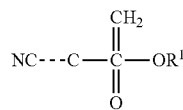

Cyanoacrylates include 2-cyanoacrylates within structure wherein $R^1$ may be selected from C1 to C16 alkyl, alkoxyalkyl, cycloalkyl, alkenyl, alkynyl, arylalkyl, aryl, allyl, adamantyl and haloalkyl groups. Suitably, alkyl ester 2-cyanoacrylate compounds, such as methyl 2-cyanoacrylate, ethyl 2-cyanooacrylate, n-butyl 2-cyanoacrylate, iso-butyl 2-cyanoacrylate, propyl cyanoacrylate, neopentyl 2-cyanoacrylate, phenyl-ethyl 2-cyanoacrylate, propargyl cyanoacrylate, $\beta$-methoxy ethyl cyanoacrylate, octyl cyanoacrylate, allyl cyanoacrylate, $\beta$-ethoxyethyl cyanoacrylate, bis cyanoacrylate and combinations thereof, may be used as the curable component of the compositions of the present invention. Suitably the electron deficient olefin component comprises a propargyl, neopentyl, phenyl-ethyl, or adamantyl cyanoacrylate or a di-cyanoacrylate and combinations thereof.

Other desirable curable cyanoacrylates which may be used in the composition of the invention include alkoxyalkyl 2-cyanoacrylate compounds, for example alkoxyalkyl 2-cyanoacrylate compounds having multiple bonds in the alkoxyalkyl chain, such as 3-ethoxylprop-ene 2-cyanoacrylate, propoxyprop-1-ene 2-cyanoacrylate, 3-isopropoxyprop-1-ene, 3-butoxyprop-1-ene 2-cyanoacrylate, 3-(2-ethoxyethoxy)prop-1-ene, vinyl acetate 2-cyanoacrylate, prop-1-yl 2-cyanoacrylate, 3-ethoxyprop-1yne 2-cyanoacrylate. Suitably, di-cyanoacrylates adhesive compounds may be employed as the curable component. For example, di-cyanoacrylate compounds such as ethylene glycol 2,2'-dicyanoacrylate, neopentyl glycol 2,2'-dicyanoacrylate and a number of other polyethylene glycol 2,2'-dicyanoacrylates have been disclosed in United Kingdom patent GB 1,048, 906. Additional di-cyanoacrylates which may be used in the present invention and have been disclosed on different documents. Examples of desirably di-cyanoacrylates include 2-butene-1,4-diol bis(2-cyanoacrylate), 2-butyne-1,4-diol bis(2-cyanoacrylate), 1,6-hexanediol-bis(2-cyanoacrylate), 1,8-octanediol-bis(2-cyanoacrylate). Specific cyanoacrylate compositions useful in this invention are also disclosed in WO 2012/139965 or WO201103768.

Suitably, $\alpha$-cyanoacrylates such as those described in European Patent EP 0 470 722B1, the contents of which are incorporated herein by reference may be employed as the curable component in the compositions of the invention. Specific examples include but are not limited to methyl $\alpha$-cyanoacrylate, ethyl-$\alpha$-cyanoacrylate, propyl $\alpha$-cyanoacrylate, allyl $\alpha$-cyanoacrylate, propargyl-$\alpha$-cyanoacrylate, 2,2,2-trifluoroethyl-$\alpha$-cyanoacrylate, 2,2,3,3-tetrafluoropropyl $\alpha$-cyanoacrylate, 2-methoxyethyl $\alpha$-cyanoacrylate and 2-ethoxyethyl $\alpha$-cyanoacrylate. Particularly suitable are neopentyl $\alpha$-cyanoacrylates which have excellent adhesive properties even at high temperatures, in addition to whitening prevention properties. Examples of alternative cyanoacrylates include but are not limited to 1-adamantylmethanol 2-cyanoacrylate and 1,10-decanediol bis-2-cyanoacrylate either of which may be used herein.

Useful methylidene malonates include those within the structure below:

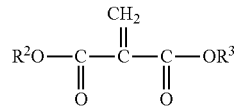

wherein $R^2$ and $R^3$ are each independently selected from C1-16, alkyl, alkoxyalkyl, cycloalkyl, alkenyl, aralkyl, aryl, allyl or haloalkyl groups.

The amount of electron deficient components (hereinafter collectively referred to as CA system) in the adhesive shall range from 10 to 80 wt-% % of the total composition.

The CA system used in the present invention can further comprise one or more additives, which are preferably selected from anionic polymerization inhibitors, radical polymerization inhibitors, thickeners, plasticizers, accelerators, tougheners, fillers, perfumes, dyes, pigments, heat resistant agents, rheological modifiers, adhesion promoters, acidic materials (like citric acid), thickeners.

Accelerators may also be included in the cyanoacrylate compositions, such as any one or more selected from calixarenes and oxacalixarenes, silacrowns, crown ethers, cyclodextrins, poly(ethyleneglycol) di(meth)acrylates, ethoxylated hydric compounds and combinations thereof. One or more anionic polymerization inhibitors can be added to the one-part adhesive of the present invention to increase the stability of the one-part adhesive during storage. Examples of useful inhibitors include sulfur dioxide, sulfur trioxide, nitric oxide, hydrogen fluoride, boron trifluoride, methane sulfonic acid, aromatic sulfonic acids, aliphatic sulfonic acids, phosphoric acids, sulfones and combinations thereof.

One or more radical polymerization inhibitors can be added to the CA system used in the present invention for the purpose of capturing radicals, which are formed by light during storage. Such inhibitors are ordinarily of the phenolic type including, for example, hydroquinone and hydroquinone monomethyl ether. One or more plasticizers may also be added to further aid in durability and impact, heat, and moisture resistance. Representative plasticizers include alkyl phthalates, azelates, adipates, sebacates, citrates, phosphates, succinates, benzoates and trimellitates.

Other additives may be added to the CA system depending on use purposes in amounts which do not adversely affect the stability or the properties of the formulation. The use of such additives is within the skill of those practicing in the cyanoacrylate adhesive art and need not be detailed herein.

If present, it is desirable that the total amount of all additives in the CA system is in the range of 0.1 to 20 wt-% based on the total amount of the CA system.

The adhesive may comprise also other components in addition to the non-reactive (co)polymer and the CA system. Such ingredients or additives can be added in order to achieve the required performance properties for example, cohesive strength, viscosity, softening point or stability. These additives may include plasticizers, stabilizers, antioxidants for improving the ageing behavior of the adhesive, pigments or fillers, tackifier to increase the tack. Preferably the adhesive is free of organic solvents.

The adhesive composition comprises at least one tackifying resin as an additional component. The resin affords an additional tackiness. It is added in an amount of 20 to 70 wt-%, preferably 30 to 60 wt-%. For example, the resins are selected from aromatic, aliphatic and/or cycloaliphatic hydrocarbon resins, as well as modified or hydrogenated versions thereof. Examples include aliphatic or alicyclic petroleum hydrocarbon resins and hydrogenated derivatives thereof, hydroabietyl alcohol and its esters, modified natural resins such as resin acids from balsamic resin, tall oil rosin or wood rosin, hydrogenated colophoniumesters; terpene resins, such as styrene-terpenes, α-methylstyrene-terpenes, phenol-modified terpene resins as well as hydrogenated derivatives thereof; acrylic acid copolymers, preferably styrene-acrylic acid copolymers. Also resin containing functional groups are possible. According to one embodiment the resins are solid, having a softening point from 70 to 140° C. (ring and ball method, DIN 52011). In another embodiment additionally liquid (at 25° C.) resins can be incorporated to adjust the melting behaviour and the melting point of the adhesive. Preferably up to 50% of all resins of the composition can be selected from liquid resins.

The plasticizer is preferably used for viscosity adjustment and is comprised in the hot melt adhesive according to the invention in a concentration of generally 0 to 25 wt-%, preferably 0 or up to 15 wt-%. Suitable plasticizers include medicinal white oils, paraffinic hydrocarbon, naphthenic mineral oils; phthalates, e.g. diisononylphthalate, dioctylphthalate; adipates; polypropylene, polybutene, polyisoprene oligomers, hydrogenated polyisoprene and/or polybutadiene oligomers; polyoxyalkylene component, e.g. polyethylene glycol, polypropylene glycol; liquid polyesters, e.g. glycerol esters, benzoate esters, vegetable or animal oils and derivatives thereof. Preferably plasticizers based on hydrocarbon compounds and oils are selected. Such plasticizers are selected so that they are fully compatible with the adhesive. The plasticizer can influence the viscosity of the adhesive, e.g. to obtain a hot melt adhesive or a viscous adhesive. The molecular weight of the plasticizer is typically from 200 to 20,000 g/mol. The amount of the plasticizer is contained in about 1 to 10 wt-% preferably 2 to 5 wt-%.

The stabilizers, more particularly UV stabilizers, or antioxidants suitable for use as additives in accordance with the present invention include phosphites, phenols, sterically hindered phenols of high molecular weight, polyfunctional phenols, sulfur- and phosphorus-containing phenols. Suitable compounds in the context of the invention are, for example, hydroquinone, hydroquinone methyl ether or phenothiazine. They are added to the composition in quantities of typically about 0.1 to 3.0 wt-%. The choice and the properties are known to the person skilled in the art.

In a specific embodiment the hot melt adhesive shall consist of 10 to 80 wt-% of derivatives of cyanoacrylic esters, cyanopentadienoate esters, methyliden malonate esters, 15 to 50 wt-% of at least one non-reactive (co)polymer as disclosed above, 20 to 80 wt-% of at least one tackifier and 50 to 0 wt-% of additives.

In particular the composition shall consist of 20 to 40 wt-% of derivatives of cyanoacrylic esters, cyanopentadienoate esters, methyliden malonate esters, 20 to 40 wt-% of at least one non-reactive (co)polymer, 35 to 70 wt-% of at least one tackifier and 50 to 0 wt-% of additives.

Preferably 0.1 to 3 wt-% of antioxidants are contained.

In another preferred embodiment the non-reactive (co)polymer shall be selected from EVA, preferably with a vinyl acetate content of more than 70 mol-%, or from copolymers based on alkylacrylates/alkyl(meth)acrylates, preferably containing from 5 to 35 mol-% of alkylmethacrylates.

Another preferred embodiment shall contain additionally 2 to 10 wt-% plasticizer e.g. ester type plasticizer, preferably triacetin, fatty acid esters, castor oil or diisononylcyclohexane-1,2-dicarboxylat.

The adhesive according to the invention can be manufactured by known processes. The copolymer(s) can be mixed and blended with the other desired additives such as CA system, tackifier and antioxidant, this can be supported by heating and melting the viscous or solid compounds. The mixing operation shall be performed until a clear mixture is formed. Entrapped air may be removed by application of a vacuum. The manufacturing process shall ensure, that no water is contaminating the composition. Such processes are known in the art.

The adhesive according to the invention can be viscous, pasty or solid at room temperature. One embodiment of the invention provides the adhesive as solid at room temperature (25° C.), as hot melt adhesive. It can be heated, transferred in a molten form, and thereafter applied. The application temperature is about 60 to 200° C., preferably up to 160° C., most preferred up to 130° C. After solidification an initial bond strength is built up. The layer of the adhesive will polymerize under ambient conditions and provide a strong thermally stable bond. Another embodiment includes a viscous adhesive at room temperature. Typically the viscosity at 25° C. is more than 50,000 mPas (Brookfield viscosimeter, EN ISO 2555). To improve the applicability it is useful to heat also such adhesive to elevated temperature prior to use for example up to 60° C. So the adhesive includes a broad range in the viscosity for application, e.g. at 160° C., the viscosity is usually in the range 100 mPas to 500,000 mPas, preferably from 1,000 to 100,000 mPas. The adhesive should be stored in the absence of moisture.

The adhesive according to the invention can be applied to different substrates. As hot melt adhesive an initial bond will be provided by the hot melt component. Thereafter the CA-system will react from the surface of the substrate and will react to form a polymeric material. Without any theory it is expected that an IPN is build up during curing. Substrates that can be bonded include metals or alloys, glasses and enamels, wood, natural or synthetic fabrics, leather, stone, ceramic, plastics, paper or card, plastics or composites. The adhesive can be used in multiple application areas for example in lamination, bookbinding, shoe-assembly, packaging, paper applications and die attachment applications, construction industry, metal bonding, car industry and all other application areas of hot melt adhesives.

The compositions according to the invention have improved application properties. As the viscosity at low temperature is high also uneven surfaces and gaps can also be bonded. As hot melt adhesive also a high green strength is affected upon cooling. The composition reduces the typical odour of cyanoacrylate systems. The final cure is affected without any additional operation to provide a stable and elastic adhesive bond, but in connection with humidity of the environment.

Example 1:

30 wt-% of ethyl-2-cyanoacrylate stabilized with 50 ppm BF3 was mixed in a dry vessel with 50 wt % of a hydrocarbon resin (Kristallex F 100) and 20 wt-% of a non reactive solid copolymer based on butyl acrylate/methyl methacrylate. The composition was solid at room temperature and has a viscosity of 4,500 mPas at 160° C.

Example 2:

20 wt-% of ethyl-2-cyanoacrylate stabilized with 50 ppm BF3 was mixed in a dry vessel with 37 wt % of a hydrocarbon resin (Kristallex F 100), 5 wt % of glyceryl triacetate and 38 wt-% of a non reactive polymer based on butyl acrylate/methyl methacrylate. The composition was solid at room temperature and has a viscosity of 40,000 mPas at 100° C.

Example 3:

20 wt-% of ethyl-2-cyanoacrylate stabilized with 50 ppm BF3 was mixed in a dry vessel with 40 wt % of a hydrocarbon resin (Kristallex F 100), 20 wt % of a liquid resin (Novares HA 100) and 20 wt-% of a non reactive polymer based on EVA (Levamelt). The composition was solid at room temperature and has a viscosity of 8,000 mPas at 130° C.

The adhesives can be stored in the absence of water. They can be heated for application and applied between 100 to 130° C. on a substrate (glass). Immediately after application the coated substrate is pressed against the second substrate. The bonded substrates are tested. They failed by destruction of the substrates.

What is claimed is:

1. An adhesive composition comprising (i) 10 to 80 wt-% of at least one derivative of cyanoacrylic esters, cyanopentadienoate esters, and methylidene malonate esters, (ii) 15 to 50 wt-% (co)polymer(s) based on unsaturated monomers selected from vinyl esters, alkyl (meth)acrylates and combinations thereof, (iii) hydrocarbon resin, and optionally (iv) an additive, wherein the adhesive comprises 20 to 70 wt-% of the hydrocarbon resin.

2. The adhesive composition according to claim 1, wherein the (co)polymer is selected from at least one of vinyl ester copolymer and (meth)acrylate copolymer.

3. The adhesive composition according to claim 1, wherein the (co)polymer is selected from at least one of ethylene vinylacetate and alkylacrylate/alkyl (meth)acrylate copolymer.

4. The adhesive composition according to claim 1, wherein the copolymer is solid at 25° C.

5. The adhesive composition according to claim 1, wherein the adhesive comprises up to 50 wt-% of hydrocarbon resin in liquid form.

6. An adhesive composition comprising (i) 10 to 80 wt-% of at least one derivative of cyanoacrylic esters, cyanopentadienoate esters, and methylidene malonate esters, (ii) 15 to 50 wt-% (co)polymer(s) based on unsaturated monomers selected from vinyl esters, alkyl (meth)acrylates and combinations thereof, (iii) hydrocarbon resin, and optionally (iv) an additive, further comprising a plasticiser selected from aromatic ester, polyetherpolyol, hydrocarbon, mineral oil and combinations thereof.

7. The adhesive composition according to claim 1, wherein the copolymer is selected from EVA having a vinyl acetate content of more than 70 mol-%; or alkylacrylate/methyl (meth)acrylate copolymers having a methyl (meth)acrylate monomer content of 5 to 35 mol-%.

8. The adhesive composition according to claim 6, wherein the copolymer has a softening point of more than 150° C.

9. The adhesive composition according to claim 1, further comprising a stabiliser that is free of organic solvents.

10. An adhesive composition comprising (i) 10 to 80 wt-% of at least one derivative of cyanoacrylic esters, cyanopentadienoate esters, and methylidene malonate esters, (ii) 15 to 50 wt-% (co)polymer(s) based on unsaturated monomers selected from vinyl esters, alkyl (meth)acrylates and combinations thereof, (iii) hydrocarbon resin, and optionally (iv) an additive, having a viscosity from 100 to 100,000 mPas at 160° C.

11. An adhesive composition comprising (i) 10 to 80 wt-% of at least one derivative of cyanoacrylic esters, cyanopentadienoate esters, and methylidene malonate esters, (ii) 15 to 50 wt-% (co)polymer(s) based on unsaturated monomers selected from vinyl esters, alkyl (meth)acrylates and combinations thereof, (iii) hydrocarbon resin, and optionally (iv) an additive, being a hot melt adhesive with a softening point of about 60 to 130° C.

12. An adhesive composition comprising (i) 10 to 80 wt-% of at least one derivative of cyanoacrylic esters, cyanopentadienoate esters, and methylidene malonate esters, (ii) 15 to 50 wt-% (co)polymer(s) based on unsaturated monomers selected from vinyl esters and/or alkyl (meth)acrylates, (iii) hydrocarbon resin, and optionally (iv) an additive, being a hot melt adhesive with a softening point of about 60 to 130° C. and a viscosity of 1,000 to 100,000 mPas at 160° C.

13. An adhesive composition comprising (i) 10 to 80 wt-% of at least one derivative of cyanoacrylic esters, cyanopentadienoate esters, and methylidene malonate esters, (ii) 15 to 50 wt-% of an ethylene vinylacetate copolymer, (iii) hydrocarbon resin and (iv) an additive selected from anionic polymerization inhibitors, radical polymerization inhibitors, thickeners, plasticizers, accelerators, tougheners, fillers, perfumes, dyes, pigments, heat resistant agents, rheological modifiers, adhesion promoters, acidic materials, thickeners and combinations thereof.

14. The adhesive composition according to claim 1, wherein the (co)polymer is an alkylacrylate/alkyl (meth)acrylate copolymer.

15. The adhesive composition according to claim 6, wherein the (co)polymer is selected from at least one of vinyl ester copolymer and (meth)acrylate copolymer.

16. The adhesive composition according to claim 10, wherein the (co)polymer is selected from at least one of vinyl ester copolymer and (meth)acrylate copolymer.

17. The adhesive composition according to claim 11, wherein the (co)polymer is selected from at least one of vinyl ester copolymer and (meth)acrylate copolymer.

18. The adhesive composition according to claim 12, wherein the (co)polymer is selected from at least one of vinyl ester copolymer and (meth)acrylate copolymer.

19. The adhesive composition according to claim 6, wherein the (co)polymer is selected from at least one of ethylene vinylacetate and alkylacrylate/alkyl (meth)acrylate copolymer.

20. The adhesive composition according to claim 10, wherein the (co)polymer is selected from at least one of ethylene vinylacetate and alkylacrylate/alkyl (meth)acrylate copolymer.

21. The adhesive composition according to claim 11, wherein the (co)polymer is selected from at least one of ethylene vinylacetate and alkylacrylate/alkyl (meth)acrylate copolymer.

22. The adhesive composition according to claim 12, wherein the (co)polymer is selected from at least one of ethylene vinylacetate and alkylacrylate/alkyl (meth)acrylate copolymer.

23. The adhesive composition according to claim 6, wherein the copolymer is solid at 25° C.

24. The adhesive composition according to claim 10, wherein the copolymer is solid at 25° C.

25. The adhesive composition according to claim 11, wherein the copolymer is solid at 25° C.

26. The adhesive composition according to claim 12, wherein the copolymer is solid at 25° C.

27. The adhesive composition according to claim 13, wherein the copolymer is solid at 25° C.

28. The adhesive composition according to claim 6, wherein the adhesive comprises up to 50 wt-% liquid resins.

29. The adhesive composition according to claim 10, wherein the adhesive comprises up to 50 wt-% liquid resins.

30. The adhesive composition according to claim 11, wherein the adhesive comprises up to 50 wt-% liquid resins.

31. The adhesive composition according to claim 12, wherein the adhesive comprises up to 50 wt-% liquid resins.

32. The adhesive composition according to claim 13, wherein the adhesive comprises up to 50 wt-% liquid resins.

33. The adhesive composition according to claim 6, wherein the copolymer is selected from EVA having a vinyl acetate content of more than 70 mol-%; alkylacrylate/methyl (meth)acrylate copolymers having a content of 5 to 35 mol-% of methyl(meth)acrylate monomers and combinations thereof.

34. The adhesive composition according to claim 10, wherein the copolymer is selected from EVA having a vinyl acetate content of more than 70 mol-%; alkylacrylate/methyl (meth)acrylate copolymers having a content of 5 to 35 mol-% of methyl(meth)acrylate monomers and combinations thereof.

35. The adhesive composition according to claim 11, wherein the copolymer is selected from EVA having a vinyl acetate content of more than 70 mol-%; alkylacrylate/methyl (meth)acrylate copolymers having a content of 5 to 35 mol-% of methyl(meth)acrylate monomers and combinations thereof.

36. The adhesive composition according to claim 12, wherein the copolymer is selected from EVA having a vinyl acetate content of more than 70 mol-%; alkylacrylate/methyl (meth)acrylate copolymers having a content of 5 to 35 mol-% of methyl(meth)acrylate monomers and combinations thereof.

37. The adhesive composition according to claim 13, wherein the copolymer is selected from EVA having a vinyl acetate content of more than 70 mol-%.

38. The adhesive composition according to claim 1, wherein the copolymer has a softening point of more than 150° C.

39. The adhesive composition according to claim 10, wherein the copolymer has a softening point of more than 150° C.

40. The adhesive composition according to claim 11, wherein the copolymer has a softening point of more than 150° C.

41. The adhesive composition according to claim 12, wherein the copolymer has a softening point of more than 150° C.

42. The adhesive composition according to claim 13, wherein the copolymer has a softening point of more than 150° C.

43. The adhesive composition according to claim 6, further comprising a stabiliser that is free of organic solvents.

44. The adhesive composition according to claim 10, further comprising a stabiliser that is free of organic solvents.

45. The adhesive composition according to claim 11, further comprising a stabiliser that is free of organic solvents.

46. The adhesive composition according to claim 12, further comprising a stabiliser that is free of organic solvents.

47. The adhesive composition according to claim 13, further comprising a stabiliser that is free of organic solvents.

48. The adhesive composition according to claim 6, wherein the (co)polymer is an alkylacrylate/alkyl (meth) acrylate copolymer.

49. The adhesive composition according to claim 10, wherein the (co)polymer is an alkylacrylate/alkyl (meth) acrylate copolymer.

50. The adhesive composition according to claim 11, wherein the (co)polymer is an alkylacrylate/alkyl (meth) acrylate copolymer.

51. The adhesive composition according to claim 12, wherein the (co)polymer is an alkylacrylate/alkyl (meth) acrylate copolymer.

* * * * *

UNITED STATES PATENT AND TRADEMARK OFFICE
CERTIFICATE OF CORRECTION

PATENT NO. : 8,877,868 B2
APPLICATION NO. : 13/777337
DATED : November 4, 2014
INVENTOR(S) : Marcus Heemann et al.

It is certified that error appears in the above-identified patent and that said Letters Patent is hereby corrected as shown below:

On The Title Page,

Page 1, in [57], Abstract (line 3): Change "methyliden" to -- methylidene --.

Page 1, in [57], Abstract (line 5): Change "iii)" to -- (iii) --.

Page 1, in [57], Abstract (line 6): Change "iv)" to -- (iv) --.

In The Specification,

Column 1, line 45: Change "a adhesive" to -- an adhesive --.

Column 1, line 47: Change "methyliden" to -- methylidene --.

Column 1, line 50: Change "iii)" to -- (iii) --.

Column 1, line 50: Change "iv)" to -- (iv) --.

Column 2, line 23: Delete "containing".

Column 2, line 23: After "polymers", insert -- . --.

Column 2, line 33: Change "alkohols" to -- alcohols --.

Column 2, line 53: After "vinyl", delete "-".

Column 2, line 54: Change "vinyithiolane" to -- vinylthiolane --.

Column 2, line 54: Change "vinyithiazoles" to -- vinylthiazoles --.

Column 2, line 55: After "derivatives", insert -- . --.

Column 3, line 18: Change "cyanopentadionate" to -- cyanopentadienoate --.

Column 3, line 40: Change "cyanooacrylate" to -- cyanoacrylate --.

Column 3, line 59: Change "3-ethoxyprop-1yne" to -- 3-ethoxyprop-1-yne --.

Column 4, line 38: After "wt-%", delete "%".

Column 6, line 5: Change "methyliden" to -- methylidene --.

Column 6, line 11: Change "methyliden" to -- methylidene --.

Signed and Sealed this
Twentieth Day of September, 2016

Michelle K. Lee
*Director of the United States Patent and Trademark Office*